(12) United States Patent
Adi

(10) Patent No.: US 7,813,095 B2
(45) Date of Patent: Oct. 12, 2010

(54) DISCRETE HOT SWAP AND OVERCURRENT-LIMITING CIRCUIT

(75) Inventor: Vinitkumar S. Adi, Duluth, GA (US)

(73) Assignee: Scientific-Atlanta, LLC, Lawrenceville, GA (US)

( * ) Notice: Subject to any disclaimer, the term of this patent is extended or adjusted under 35 U.S.C. 154(b) by 516 days.

(21) Appl. No.: 11/829,112

(22) Filed: Jul. 27, 2007

(65) Prior Publication Data

US 2009/0027818 A1    Jan. 29, 2009

(51) Int. Cl.
  H02H 3/08 (2006.01)
  H02H 9/02 (2006.01)
(52) U.S. Cl. .................... 361/93.1; 361/93.9
(58) Field of Classification Search ............. 361/93.1, 361/93.9
  See application file for complete search history.

(56) References Cited

U.S. PATENT DOCUMENTS

| | | | | |
|---|---|---|---|---|
| 5,572,395 | A | * | 11/1996 | Rasums et al. ............ 361/58 |
| 5,747,975 | A | * | 5/1998 | Colandrea et al. .......... 323/276 |
| 5,910,690 | A | | 6/1999 | Dorsey et al. |
| 6,163,712 | A | * | 12/2000 | Winkler et al. ............ 455/572 |
| 6,184,669 | B1 | * | 2/2001 | Matsuo .................... 323/303 |

FOREIGN PATENT DOCUMENTS

EP    0 661 643 A    5/1995

OTHER PUBLICATIONS

Data Sheet of Linear Technology Corporation entitled "LT1641, Positive High Voltage Hot Swap Controller", (bearing copyright date 1999) pp. 1-12.
Data Sheet of Maxim Integrated Products entitled "+724,SOT23/TDFN, Simple Swapper Hot-Swap Controllers", Maxim 19-1988; Rev 2; Mar. 2005, pp. 1-14.
Data Sheet of Texas Instruments Incorporated entitled "UC2914, UC3914 5-V to 35-V Hot Swap Power Manager", SLUS425C—Dec. 2003—Revised Jul. 2004, pp. 1-24.
Data Sheet of Texas Instruments Incorporated entitled "TPS2490, TPS2491 Positive High-Voltage Power-Limiting Hotswap Controller", SLVS503—Nov. 2003, pp. 1-18.
PCT International Search Report, Applicant: Scientific-Atlanta; International Application No. PCT/US2008/070843; Date of Mailing—Oct. 31, 2008, 5 pgs.
"Hot-Plug Protection Circuit", IBM Technical Disclosure Bulletin, IBM Corp. New York, US vol. 37, No. 9, Sep. 1, 1994, pp. 189-192.

* cited by examiner

Primary Examiner—Stephen W Jackson
Assistant Examiner—Scott Bauer
(74) Attorney, Agent, or Firm—Tarolli, Sundheim, Covell & Tummino LLP

(57) ABSTRACT

The present invention is directed towards a discrete protection circuit located on a circuit card, and systems and methods related thereto. The protection circuit protects circuit card components from an inrush current and overcurrent conditions. The discrete protection circuit includes a switch to control a delivered load current to an output port, an SCR which latches when an overcurrent condition is detected across a sense resistor, and a series of resistors and a capacitor that determines the retry delay subsequent to an overcurrent detection. Advantages of the discrete protection circuit of the invention over prior art integrated circuits include: lower parts counts, lower production costs, greater flexibility, and increased reliability.

20 Claims, 6 Drawing Sheets

DISCRETE HOT SWAP AND OVERCURRENT-LIMITING CIRCUIT

TECHNICAL FIELD

The present invention is generally related to a communications system and, more particularly, is related to systems, methods, and apparatus for connecting circuit cards with discrete hot swap and overcurrent-limiting circuits to a live backplane.

BACKGROUND OF THE INVENTION

Integration of hot swap and overcurrent-limiting circuits are becoming an essential part of modern systems since any system downtime is unacceptable before and during any system hardware upgrades. Although there are many integrated circuits in the market today that handle these functions, they are expensive and single-sourced. Therefore, there is a need to address the issues of performing hot swaps as well as providing current-limiting protection with a simple and cost effective solution.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

The invention now will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. Furthermore, all "examples" given herein are intended to be non-limiting.

The present invention is directed towards a discrete protection circuit that allows connection or removal of a protected circuit card from a live backplane without any service interruptions. Importantly, the power that is supplied by the backplane to other connected circuit cards is not affected by the connection or removal of a circuit card. More specifically, the discrete protection circuit is located on the circuit card and limits the current inflow to that circuit card. Due to the limited current flow, the voltage across the backplane remains constant. Additionally, the discrete protection circuit is used as an overcurrent-limiting circuit. A circuit card equipped with the discrete protection circuit can immediately detect a possible short circuit on the card, which may be caused by faulty component(s), and can limit the input current to protect the circuit card and the backplane; thereby avoiding a complete shutdown of the system.

Figure 1:
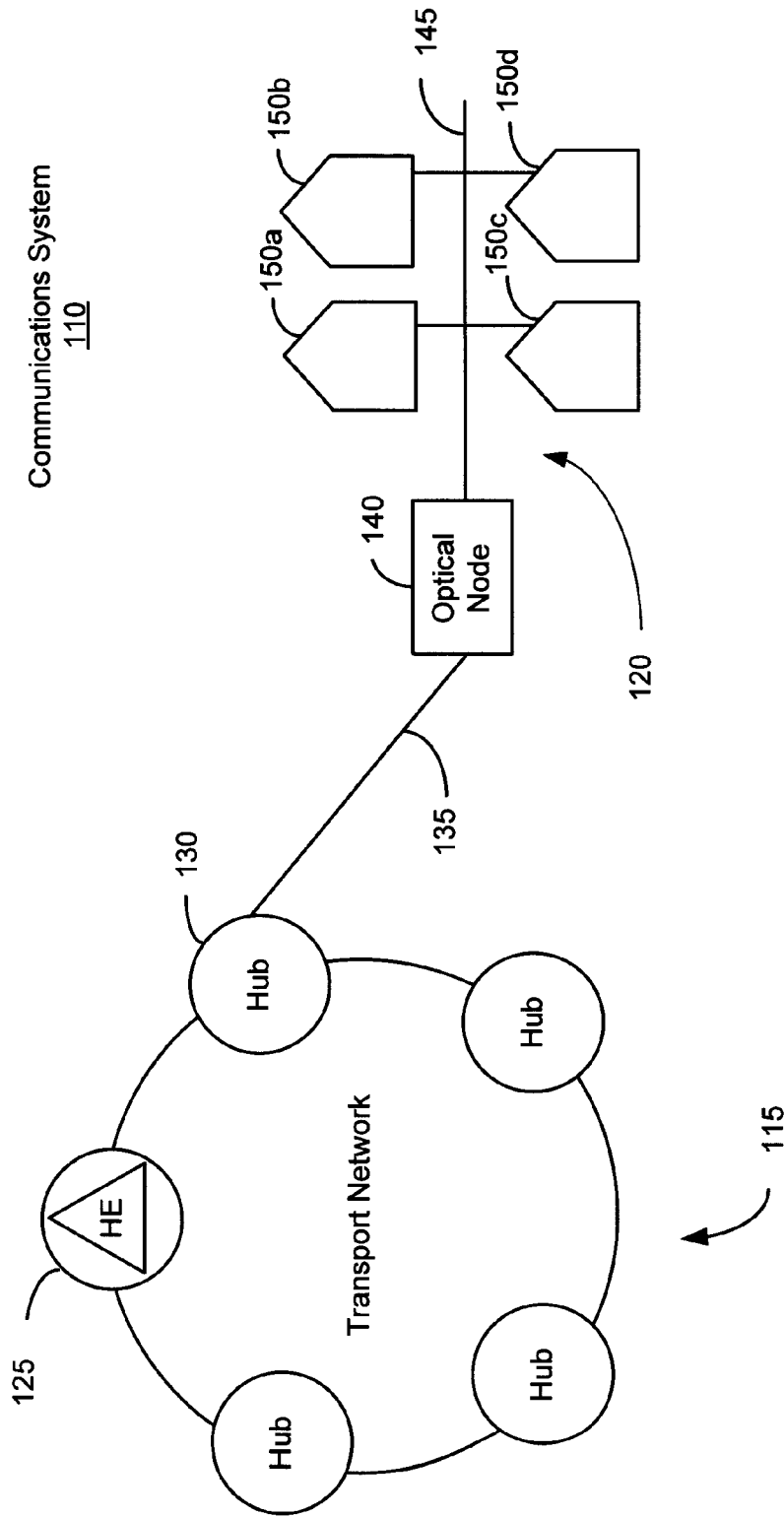
FIG. 1 is an abridged block diagram of a communications system that is suitable for use in implementing the present invention.

FIG. 1 is an abridged block diagram of a communications system 110 that is suitable for use in implementing the present invention. Typically, a communications system 110 includes a transport network 115 and a transmission network 120. The transport network 115, which is fiber optic cable, connects a headend 125 and hubs 130 for generating, preparing, and routing programs and other optical packets over longer distances; whereas a transmission network 120, which is coaxial cable, generally routes electrical packets over shorter distances. Programs and other information packets received, generated, and/or processed by headend equipment racked in backplanes is either broadcasted to all subscribers in the system 110, or alternatively, the programs can be selectively delivered to one or more subscribers. Fiber optic cable 135 connects the transport network 115 to an optical node(s) 140 that converts the packets from optical packets into electrical packets. Thereafter, coaxial cable 145 routes the packets to one or more subscriber premises 150a-d.

In the reverse, or upstream, direction, subscriber premises equipment, such as set-top boxes or cable modems, generate reverse electrical signals. The optical node 140, which includes an optical transmitter, converts the reverse electrical signals into optical signals for further routing to backplane equipment at the hubs 130. The backplane equipment in the hubs 130 then route the optical signals to the equipment in the headend 125 for further processing.

Figure 2:
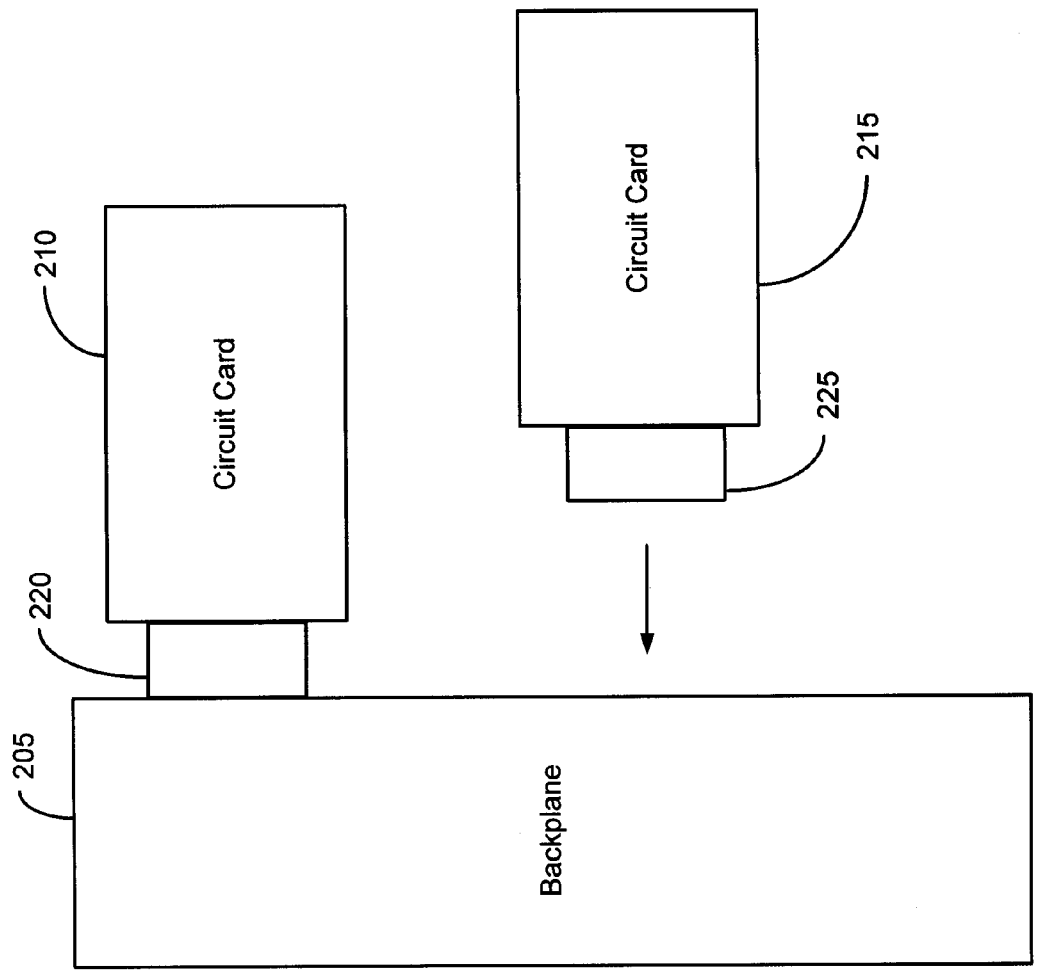
FIG. 2 is a block diagram of a backplane for receiving and powering conventional circuit cards.

FIG. 2 is a block diagram of a backplane, which may be located in the headend 125 and/or hubs 130, for receiving and powering conventional equipment, such as circuit cards. A live backplane 205 is configured to accept a plurality of circuit cards 210, 215 via a connector 220, 225. The circuit cards 210, 215 typically include many active components and circuits, such as microprocessors and Field Programmable Gate Arrays (FPGAs), which require power in order to generate the appropriate signals. In FIG. 2, circuit card 210 is connected to the live backplane 205 and circuit card 215 is about to be connected with the live backplane 205. If the circuit cards 210, 215 do not include a circuit that limits the power, a rush of current is drawn from the backplane 205 through circuit card 215 when circuit card 215 is connected. The rush of current can cause in a voltage drop across the backplane 205, thereby potentially disrupting the operation of the connected circuit cards and the overall system operation.

Figure 3:
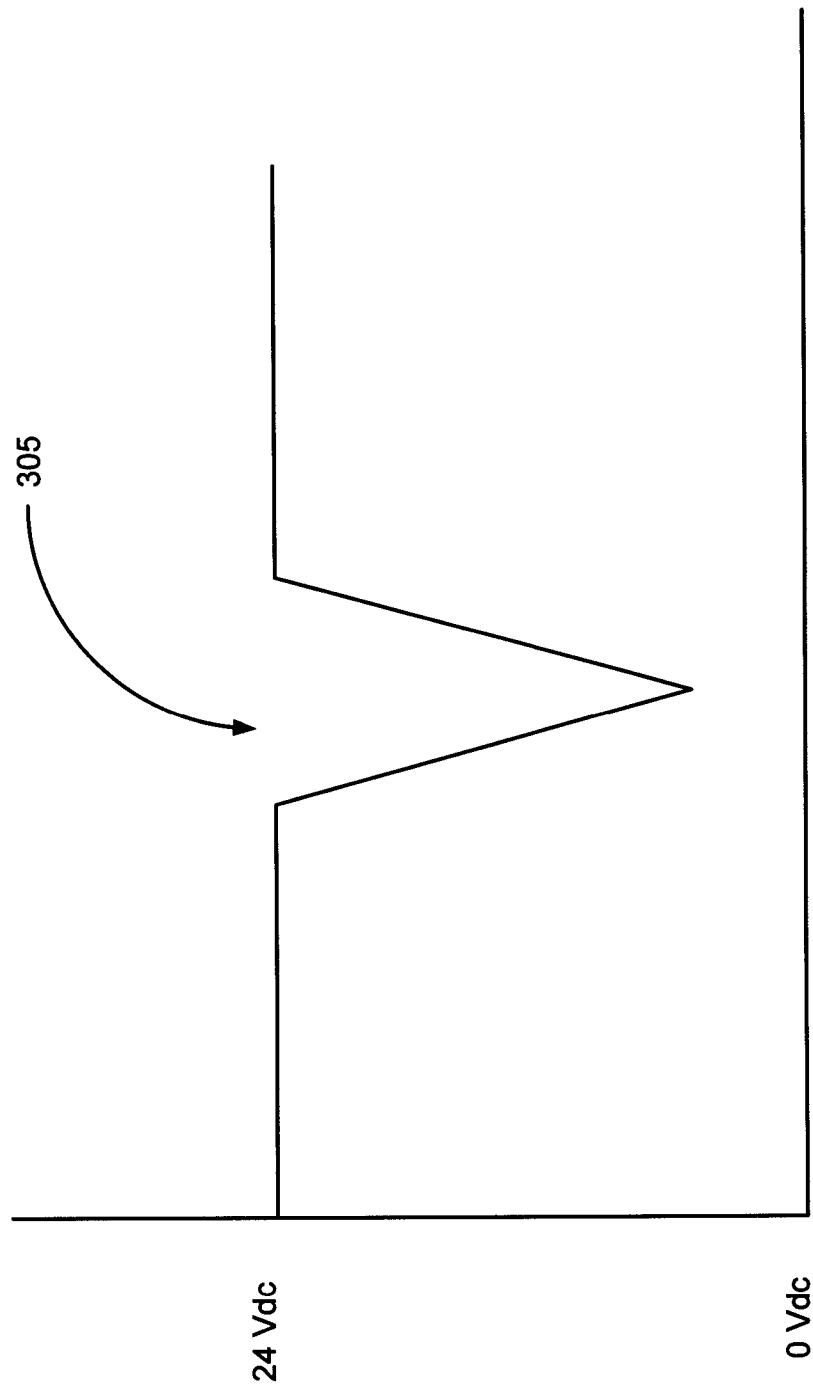
FIG. 3 illustrates the drop in voltage across a backplane when unprotected circuit cards are connected thereto.

FIG. 3 illustrates the drop in voltage when conventional circuit cards are connected to a live backplane. Prior to circuit card 215 being connected to the live backplane 205, the voltage across the backplane, which powers all the connected circuit cards, is 24 Vdc. At the time 305 circuit card 215 is connected to backplane 205, the voltage across the backplane drops significantly. As mentioned, active components on any of the previously connected circuit cards 210 are susceptible to the drop in voltage. Furthermore, the active components on the newly connected circuit card 215 may be adversely affected by the ensuing rush of current through the circuit card 215.

Figure 4:
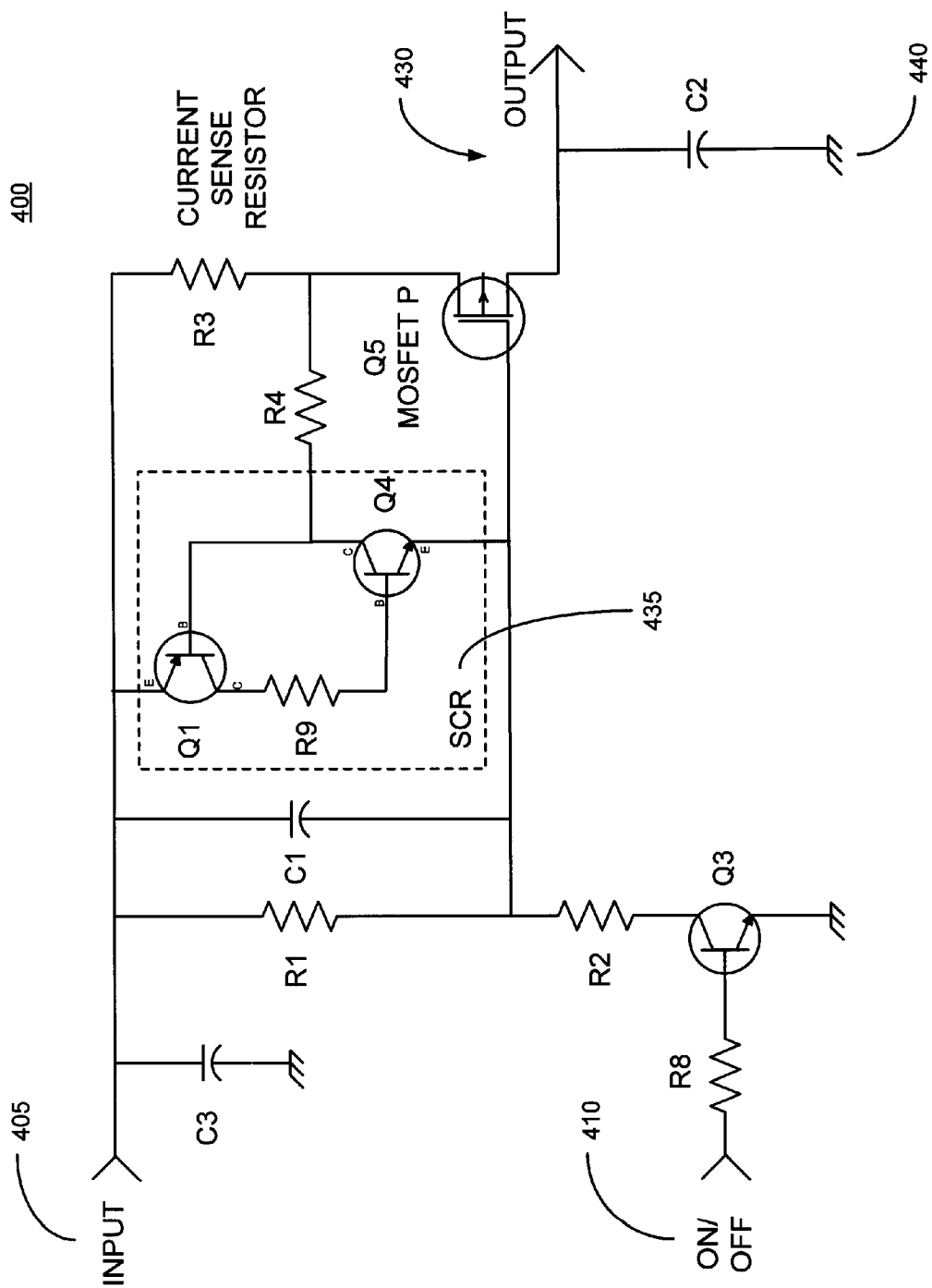
FIG. 4 is an illustration of a schematic of the discrete protection circuit of the present invention.
Figure 5:
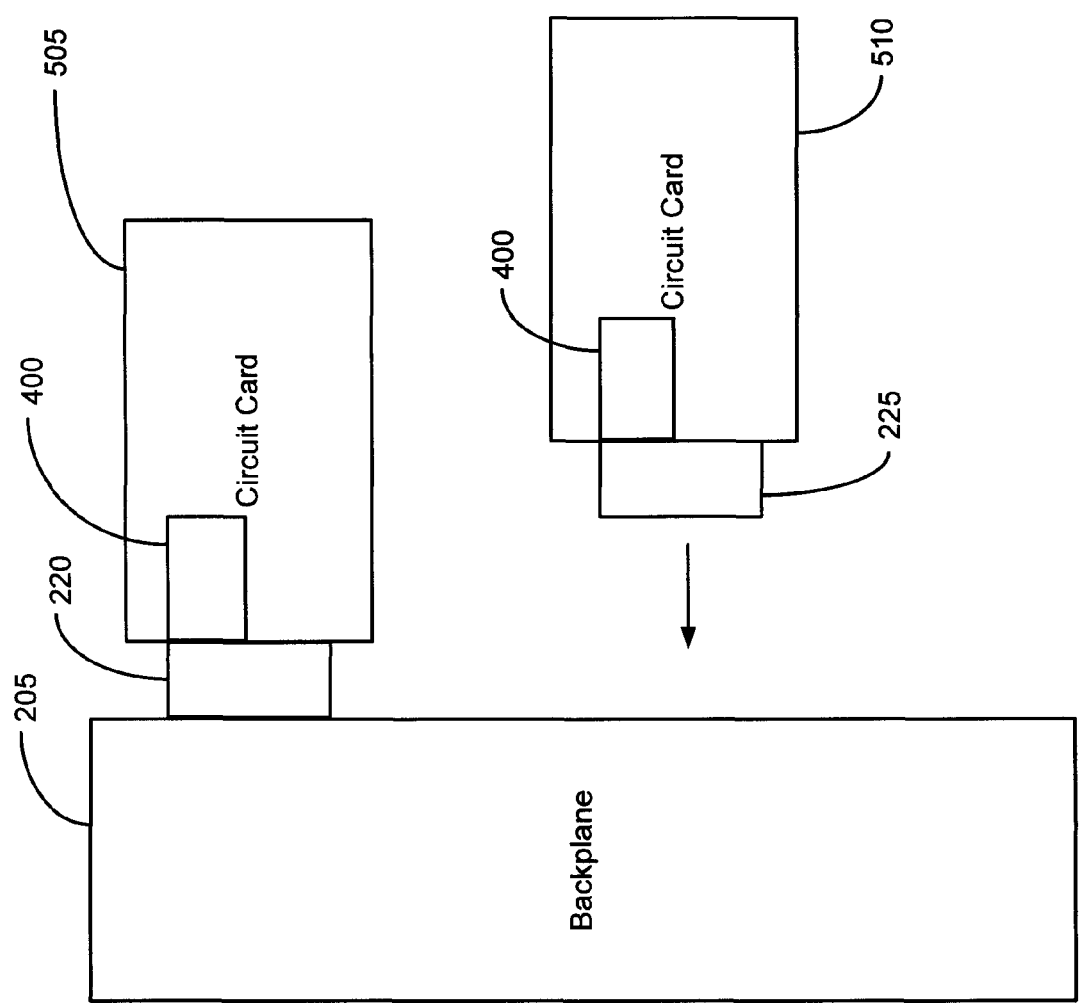
FIG. 5 is a block diagram of the live backplane for receiving and powering circuit cards including the discrete protection circuit of FIG. 4.

FIG. 4 is an illustration of a schematic of an exemplary embodiment of the discrete protection circuit of the present invention that provides a hot swap and over current-limiting circuit. The discrete circuit 400 is preferably included on each circuit card 505, 510 that will be connected to or removed from the live backplane 205 for ultimate protection as shown in FIG. 5. An input pin 405 to the discrete circuit 400 connects to the backplane 205 so that power passes through the discrete circuit 400 prior to any other components on the circuit card 505, 510. In this manner, the discrete circuit 400 is able to limit the inrush of current when it connects to the live backplane 205, thereby preventing a subsequent drop in voltage across the backplane 205. Prior to a hot swap, an on/off pin 410 can be set to the on position in order to protect the circuit card 505, 510. Alternatively, it can be used manually if a user wishes to turn on and off the power to the circuit card 505, 510 when it is inserted into a backplane 205.

As shown in the exemplary embodiment of FIG. 4, the discrete circuit 400 includes a sense resistor R3 to detect an overcurrent condition, a discrete SCR 435 which latches when an overcurrent condition is detected, and a switch Q5 to control an output load current, so that no load current is delivered when an overcurrent condition is detected. When the on/off pin 410 is turned on, for example a logic high is associated with the on/off pin 410, and power is supplied to the discrete circuit 400, a transistor Q3 of the circuit 400 is turned on. When transistor Q3 is turned on, it will initiate the charging of the capacitor C1. Once the voltage across capacitor C1 exceeds the gate threshold voltage of a switch Q5, an input source 405 is connected to the output load 430 (i.e., to the load components on the circuit card) through the switch Q5.

Figure 6:
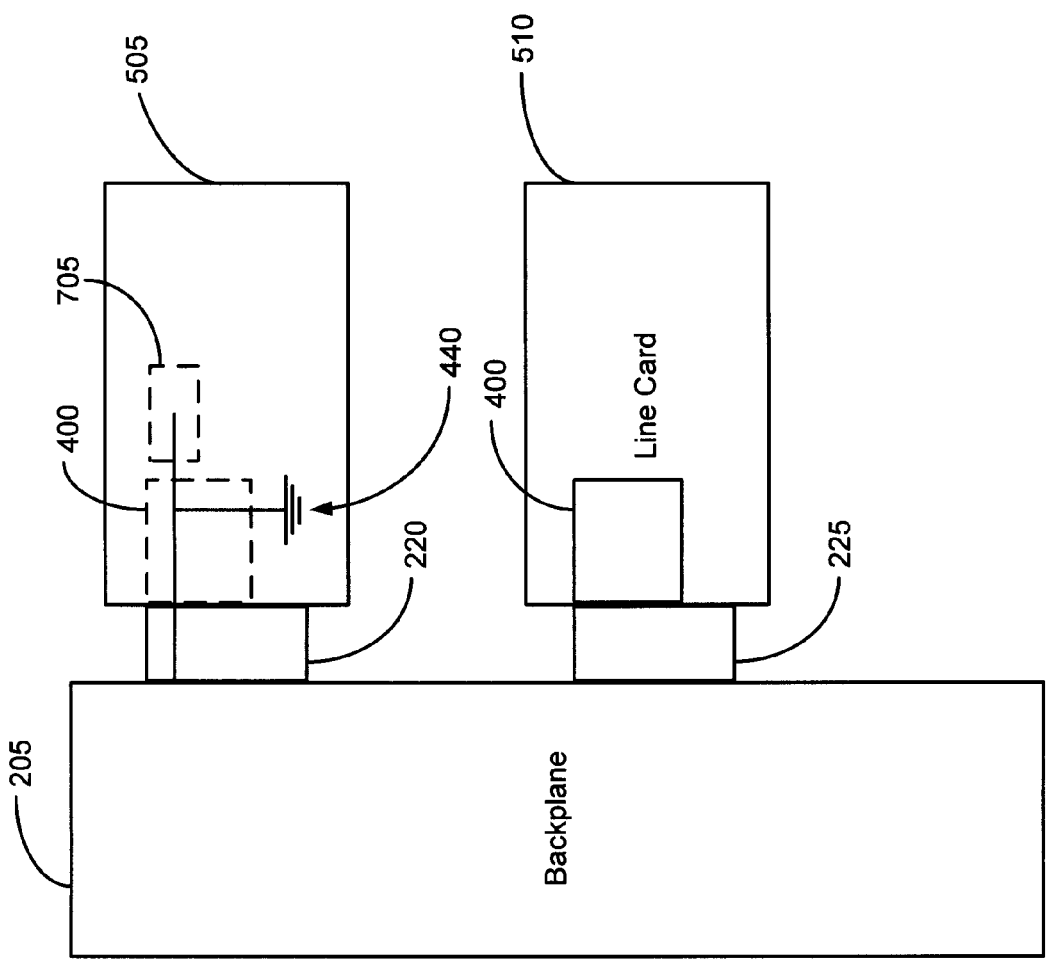
FIG. 6 is a block diagram illustrating the current-limiting function of the discrete protection circuit of FIG. 4.

FIG. 6 is a block diagram illustrating the current-limiting function of the discrete circuit of FIG. 4. If, for example, a load circuit, such as a microprocessor or FPGA, fails on circuit card 505, the discrete circuit 400 prevents the short from damaging the circuit card 505 by limiting the available current from the input 405. In operation, resistor R3 senses the load current at output 430. More specifically, the load current passes through resistor R3 and switch Q5. The load current through resistor R3 develops a proportional voltage across it that is sensed by transistor gates Q1 and Q4 to detect a fault condition. If a voltage drop across resistor R3 is greater than the emitter-base (E-B) diode drop of transistor Q1, then Silicon Controlled Rectifier (SCR) 435, formed by transistors Q1 and Q4, will go into a latch state. This will restrict the input voltage at the gate of switch Q5, and in turn will shut switch Q5 off. Concurrently, capacitor C1 will discharge through Q1 and Q4. As soon as the capacitor C1 is completely discharged, SCR 435 turns off. Switch Q5 remains off until capacitor C1 is charged back above the gate threshold voltage of the switch Q5. Capacitor C1 charge time can be controlled by selecting appropriate values for resistors R1 and R2. Additionally, capacitor C1 charge time controls a retry delay following the detection of the over-current condition.

Switch Q5, transistor Q1 and transistor Q4, which form the SCR 435, resistor R1, resistor R2, and capacitor C1 form a circuit that has a fast initial response to changes in load current, for example, due to plugging the circuit card into a live backplane, and yet also allows a designer to set the retry delay. The retry delay is a predetermined time following a fault condition that the discrete circuit 400 takes before it retries to deliver current back to the load. In this manner, when the fault is cleared, the discrete circuit 400 then retries after the predetermined time and resumes normal operation. The retry delay is also useful during a cold start (i.e., an initial turn-on of the circuit card) where large load capacitors located on the circuit card are required to be charged with limited input current. Furthermore, the retry delay also keeps switch Q5 dissipation under control during an output short circuit condition.

The discrete protection circuit of the invention offers distinct advantages over prior art integrated circuits that are designed for hotswap and current-limiting applications. For instance, integrated circuit overcurrent protection circuits are relatively expensive as they are typically single sourced and designed for particular applications. The present invention, however, can be made of relatively inexpensive parts that are easily accessible from a variety of sources. Furthermore, because they are single sourced, most integrated circuits for hot swap applications are not compatible with each other. The present invention provides a hot swap overcurrent protection circuit that is suitable and cost-effective for a variety of applications. The protection circuit of the present invention also has a lower parts count and an increased reliability.

Accordingly, systems and methods have been described regarding a discrete protection circuit that provides protection to circuit cards that are attached to a live backplane. It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and protected by the following claims.

What is claimed is:

1. A system comprising:
a live backplane adapted to provide a backplane voltage to one or more circuit cards connected thereto; and
at least one protected circuit card adapted to couple to the live backplane, the protected circuit card including a discrete protection circuit adapted to limit the current provided to the protected circuit card when an input of the protected circuit card is coupled to the backplane voltage, the discrete protection circuit comprising:
   a first capacitor coupled to the input of the protected circuit card and adapted to accumulate a charge accordingly;
   a sense resistor adapted to sense a load current and have a voltage proportional to the load current so that an overcurrent condition can be detected by sensing the voltage across the sense resistor;
   a switch adapted to control the load current delivered to an output port;
   a discrete SCR adapted to latch when an overcurrent condition is detected, thereby preventing the flow of the load current to the output port; and
   a series of resistors coupled between the input of the protected circuit card and ground, the series of resistors adapted to set a charge time for the first capacitor, the charge time controlling the retry delay subsequent to the detection of an overcurrent condition.

2. The system of claim 1, wherein the SCR comprises a first transistor having an emitter-base voltage, the SCR adapted to turn off the switch when the voltage across the sense resistor exceeds the emitter-base voltage of the SCR.

3. The system of claim 1, wherein the first capacitor discharges through SCR when the switch is turned off.

4. The system of claim 1, the discrete protection circuit further comprising:
an on/off pin adapted to turn the discrete protection circuit on and off; and
a control transistor connected between the series resistors and ground, the control transistor adapted to turn on when the on/off pin is in an on position, thereby initiating the charging of the first capacitor.

5. The system of claim 1, wherein at least one circuit card is connected to the live backplane.

6. The system of claim 5, wherein the voltage provided to the at least one connected circuit card remains constant while a protected circuit card is being connected to the live backplane.

7. The system of claim 1, wherein at least one protected circuit card is coupled to the backplane.

8. The system of claim 1, wherein the series of resistors further comprises:
a first resistor connected between the input of the input of the protected circuit card and an intermediate node, and
a second resistor connected between the intermediate node and the ground, and wherein the switch has a control input that is coupled to the intermediate node for controlling operation of the switch.

9. The system of claim 8, wherein the first capacitor and the SCR each is connected in parallel with each other between the input of the protected circuit card and the intermediate node, such that the switch is operated to prevent the flow of load current to the output in response to the SCR being latched.

10. A method of providing a discrete protection circuit, comprising:
providing a first capacitor connected to receive an input and accumulate a charge based on the input;
providing a sense resistor adapted to sense a load current and have a voltage proportional to the load current so that an overcurrent condition can be detected by sensing the voltage across the sense resistor;
providing a switch to control the load current delivered from the input to an output port;
providing a discrete SCR adapted to latch when an overcurrent condition is detected, thereby preventing the flow of the load current to the output port; and
providing a series of resistors coupled between the input and ground, the series of resistors adapted to set a charge time for the first capacitor, the charge time controlling the retry delay following the turning off of the switch due to the detection of an overcurrent condition.

11. The method of claim 10, further comprising:
providing an on/off pin adapted to turn the discrete protection circuit on and off; and
providing a control transistor connected between the series resistors and ground, the control transistor adapted to turn on when the on/off pin is in an on position, thereby initiating the charging of the first capacitor.

12. The method of claim 10, further comprising providing an input from a live backplane to the protection circuit.

13. The method of claim 10, further comprising coupling the protection circuit to electrical components to form a protected circuit board.

14. A discrete protection circuit, comprising:
a first capacitor coupled to an input and adapted to accumulate a charge based on a voltage at the input;
a sense resistor adapted to sense a load current and have a voltage proportional to the load current so that an overcurrent condition can be detected by sensing the voltage across the sense resistor;
a switch adapted to control the load current delivered from the input to an output port;
a discrete SCR adapted to latch when an overcurrent condition is detected, thereby preventing the flow of the load current to the output port; and
a series of resistors coupled between the input and ground, the series of resistors adapted to set a charge time for the first capacitor, the charge time controlling the retry delay subsequent to the detection of an overcurrent condition.

15. The protection circuit of claim 14, further comprising:
an on/off pin adapted to turn the discrete overcurrent protection circuit on and off; and
a control transistor connected between the series of resistors and ground, the control transistor adapted to turn on when the on/off pin is in an on position, thereby initiating charging of the first capacitor.

16. The protection circuit of claim 14, the SCR comprising a first transistor with a base-emitter voltage and adapted to turn off the switch when the load current resistor voltage exceeds the base-emitter voltage.

17. The protection circuit of claim 14, wherein the first capacitor discharges through the SCR when the switch is turned off.

18. The protection circuit of claim 14, wherein the charge time of the capacitor can be controlled by selecting the appropriate values of the series of resistors.

19. The protection circuit of claim 14, wherein the series of two resistors further comprises:
a first resistor connected between the input of the input and an intermediate node, and
a second resistor connected between the intermediate node and the ground, and wherein the switch has a control input that is coupled to the intermediate node for controlling operation of the switch.

20. The protection circuit of claim 19, wherein the first capacitor and the SCR each is connected in parallel with each other between the input and the intermediate node, such that the switch is operated to prevent the flow of the load current to the output in response to the SCR being latched.

\* \* \* \* \*